United States Patent
Lemoff et al.

(10) Patent No.: US 7,123,836 B2
(45) Date of Patent: Oct. 17, 2006

(54) ALL-OPTICAL NETWORK DISTRIBUTION SYSTEM

(75) Inventors: Brian E. Lemoff, Union City, CA (US); Julie E. Fouquet, Portola Valley, CA (US); Ian Hardcastle, Sunnyvale, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 717 days.

(21) Appl. No.: 09/906,991

(22) Filed: Jul. 16, 2001

(65) Prior Publication Data

US 2003/0011852 A1  Jan. 16, 2003

(51) Int. Cl.
- H04B 10/20 (2006.01)
- H04J 14/00 (2006.01)
- H04J 14/08 (2006.01)
- G02B 6/26 (2006.01)

(52) U.S. Cl. .................. 398/66; 398/58; 398/71; 398/100; 385/15

(58) Field of Classification Search ........... 398/66, 398/70, 71, 73, 76, 58, 100; 385/9, 15, 27, 385/28, 31, 59
See application file for complete search history.

(56) References Cited

U.S. PATENT DOCUMENTS

| | | | | |
|---|---|---|---|---|
| 4,883,335 A | * | 11/1989 | Alferness et al. | 385/48 |
| 5,071,214 A | * | 12/1991 | Jacob et al. | 385/12 |
| 5,335,304 A | * | 8/1994 | Smith et al. | 385/135 |
| 5,502,586 A | * | 3/1996 | Ohnsorge | 398/45 |
| 5,539,657 A | * | 7/1996 | Utsumi et al. | 725/75 |
| 5,625,478 A | * | 4/1997 | Doerr et al. | 398/4 |
| 5,636,022 A | * | 6/1997 | Priest | 356/466 |
| 5,760,949 A | * | 6/1998 | Motoshima et al. | 359/341.33 |
| 5,979,423 A | * | 11/1999 | Poindexter et al. | 123/697 |
| 6,052,179 A | * | 4/2000 | Prohaska et al. | 356/73.1 |
| 6,394,661 B1 | * | 5/2002 | Cull et al. | 385/59 |
| 6,546,168 B1 | * | 4/2003 | Xie et al. | 385/39 |
| 2002/0041379 A1 | * | 4/2002 | Lin et al. | 356/483 |

* cited by examiner

Primary Examiner—M. R. Sedighian

(57) ABSTRACT

The optical fiber-based communication system comprises a distribution optical fiber that extends proximately to a plurality of end users, and tap-off modules coupled to the distribution optical fiber at intervals along its length. Each of the tap-off modules includes a port in optical communication with the distribution optical fiber. The optical fiber-based communication system additionally comprises a branch optical fiber connected to the port of each of at least some of the tap-off modules and that extends to a corresponding one of the end users.

16 Claims, 3 Drawing Sheets

ALL-OPTICAL NETWORK DISTRIBUTION SYSTEM

BACKGROUND OF THE INVENTION

Conventionally, the "last mile" connection between a communication network and an end user has been provided by an electrical connection such as a telephone line, a cable television system or a satellite link. However, the speed of connections demanded by consumers will soon exceed the capacity of electrical connections and the substantially greater bandwidth offered by fiber optic-based connections will be required.

A number of alternatives exist in a optical fiber-based communication system to provide the last mile connection to the end user. For example, a single optical fiber may be provided for each potential end user. However, this approach is expensive. Alternatively, an optical fiber may be shared among a number of end users. In this case, a branch optical fiber extends from the shared optical fiber to each end user. One end of the branch optical fiber would be spliced to the shared optical fiber and the other end of the branch optical fiber would be connected to the end user's equipment. With conventional optical fibers, splicing the branch optical fiber to the shared optical fiber is expensive to perform, even at the time the optical fiber-based communication system is installed.

It is likely that, when an optical fiber-based communication system is initially installed, the number of end users who will opt to subscribe to the optical communication service will be small compared with the total number of potential end users. Under these circumstances, the cost of providing an optical fiber connection to all end users, regardless of whether or not they subscribe to the optical communication service, would significantly increase the initial installation cost of the optical fiber-based communication system. The initial installation cost could be reduced by providing connections only to actual end users. However, this approach gives rise to the problem of how to make simple and inexpensive connections to new end users who only decide to subscribe to the optical communication service after the initial installation of the optical fiber-based communication system has been performed. Existing proposals may not offer this capability, and those that do may require that service to end users already connected to the distribution fiber be interrupted when a new user connection is made. Such an interruption of service is unacceptable to the existing end users.

Thus, what is needed is a multiple end user optical fiber-based communication system that is structured to enable additional end users to be connected simply and inexpensively after the system has been initially installed and without the need to interrupt service to existing end users.

SUMMARY OF THE INVENTION

The invention provides an optical fiber-based communication system. The optical fiber-based communication system comprises a distribution optical fiber that extends proximately to a plurality of end users, and tap-off modules coupled to the distribution optical fiber at intervals along its length. Each of the tap-off modules includes a port in optical communication with the distribution optical fiber. The optical fiber-based communication system additionally comprises a branch optical fiber connected to the port of each of at least some of the tap-off modules and that extends to a corresponding one of the end users.

The invention also provides a distribution fiber system for an optical fiber-based optical communication system. The distribution fiber system comprises a distribution optical fiber and tap-off modules coupled to the distribution optical fiber at intervals along its length. Each of the tap-off modules includes a port in optical communication with the distribution optical fiber.

Finally, the invention provides a method for establishing an optical fiber-based communication system. In the method, a distribution fiber system is provided. The distribution fiber system includes a distribution optical fiber and tap-off modules coupled to the distribution optical fiber at intervals along its length. Each of the tap-off modules includes a port in optical communication with the distribution optical fiber. The distribution fiber system is installed proximately to a plurality of end users. At least one of the end users is connected to the distribution fiber system. For each end user connected to the distribution fiber system, a branch optical fiber is provided, the branch optical fiber is installed between the end user and one of the tap-off modules, and the branch optical fiber is connected to the port of the one of the tap-off modules.

The optical fiber-based communication system, distribution fiber system and method according to the invention enable an optical communication service to be provided to end users who initially subscribe without the expense of providing connections to end users who are do not subscribe. The optical fiber-based communication system, distribution fiber system and method according to the invention additionally enable end users who later opt to subscribe to be connected to the optical communication system simply, inexpensively and without the need to interrupt service to existing end users.

DETAILED DESCRIPTION OF THE INVENTION

Figure 1:
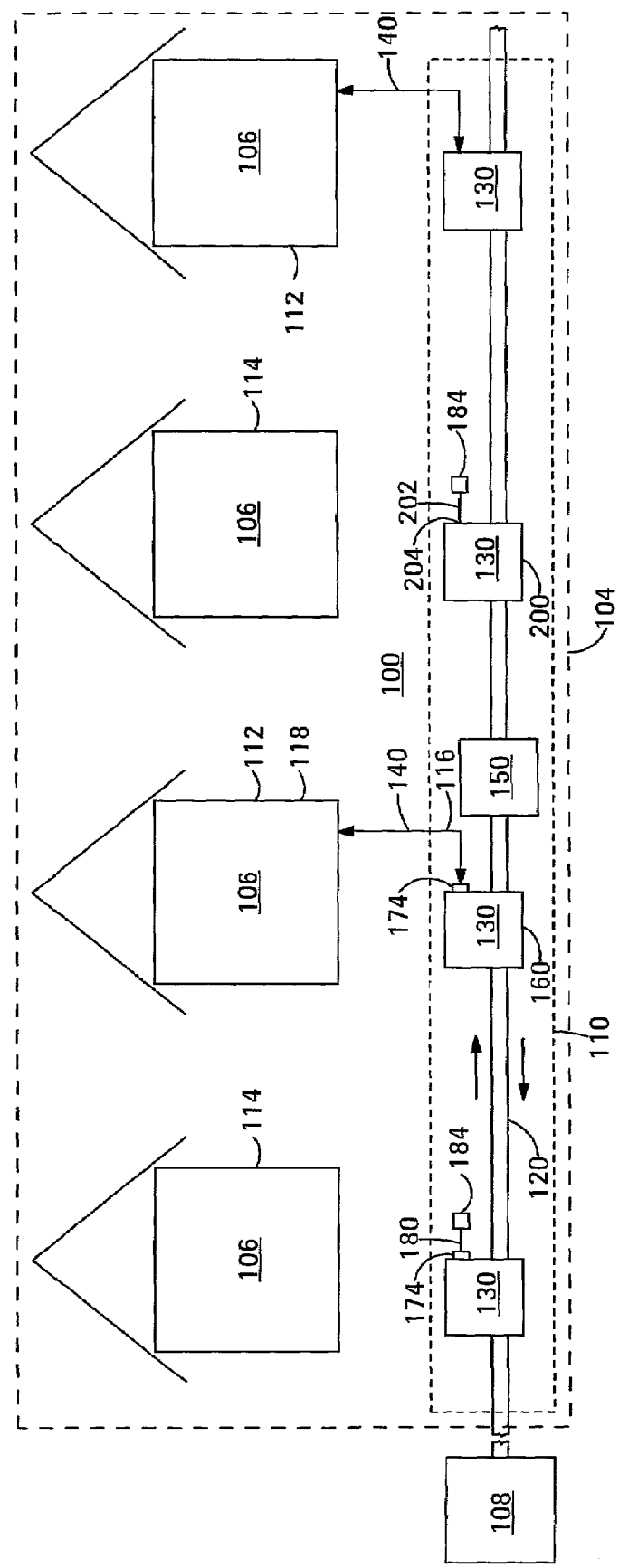
FIG. 1 is a block diagram showing an embodiment of an optical fiber-based communication system according to the invention that incorporates an embodiment of a distribution fiber system according to the invention.

FIG. 1 shows an exemplary embodiment 100 of an optical fiber-based communication system according to the invention that incorporates an embodiment 110 of a distribution fiber system according to the invention. In the example shown, the optical fiber-based communication system 100 provides an optical communication service to a location 104, such as a street, proximate to the end users 106. The end users shown are examples of the substantially larger number of end users that would typically be served by the distribution optical fiber. Each end user may include more than one individual person or business.

The distribution fiber system 110 includes the distribution optical fiber 120 and the tap-off modules 130. The distribution optical fiber 120 extends from the communication head end 108 to the location 104 and passes through the location proximately to each of the end users 106. For example, the distribution fiber system may run along a street in which a number of end users are located. The distribution fiber system may be buried under the street, or may be suspended from utility poles running along the street or along the backs of the premises on the street. As another example, the distribution fiber system may be run under the floors or in the walls or ceilings of an office building or apartment complex.

The distribution fiber system 110 is manufactured to include at least one tap-off module 130 for each of the end users 106 in the location 104. The tap-off modules are spaced along the length of the distribution fiber system 110 with a spacing approximating the spacing of the end users' premises in the location. For example, an embodiment of the distribution fiber system configured for installation in a location that is a suburban street with 20 m-wide housing lots would be manufactured to include at least one tap-off module every 20 m over the portion of its length that extends along the street. More than one tap-off module may be provided per end user to accommodate growth in demand and the need of some end users to receive multiple services.

The distribution fiber system 110 may be manufactured with the spacings between its tap-off modules 130 customized for the location 104 in which the distribution fiber system will be installed. Alternatively, different versions of the distribution fiber system may be manufactured, each with a different predetermined spacing between its tap-off modules. The version having a tap-off module spacing that approximates to the spacing of users' premises in the location is then selected for installation in the location.

The distribution fiber system 110 may include one or more regeneration amplifiers. An exemplary regeneration amplifier is shown at 150. A regeneration amplifier may interrupt the distribution optical fiber 120 part-way between two adjacent tap-off modules 130 as shown, or may be housed in one or more of the tap-off modules. A regeneration amplifier may provide either one-way amplification, in which it amplifies optical signals either transmitted to or transmitted by the communication head end 108, or two-way amplification, in which it amplifies optical signals both transmitted to and transmitted by the communication head end 108.

Finally, the distribution fiber system 110 includes additional elements that provide it with suitable mechanical properties, such as tensile strength, protect it from the environment and supply power to the regeneration amplifiers. Such elements are conventional in optical fiber-based communication systems and are therefore not shown.

The installation cost of the optical communication system 100 is minimized by connecting only the actual end users 112 to the distribution fiber system 110 when the distribution fiber system is initially installed in the location 104. The actual end users are those of the end users 106 who subscribe to the optical communication service. A branch optical fiber 140 extends from the premises of each actual end user 112 to a nearby tap-off module 130 of the distribution fiber system. For example, the branch optical fiber 116 extends from the premises of the actual end user 118 to the port 174 of the tap-off module 160.

Each branch optical fiber 140 includes an optical fiber and additional elements that provide it with suitable mechanical properties, such as tensile strength, and that protect the optical fiber from the environment. Such elements are conventional in optical fiber-based communication systems and are therefore not shown.

When the distribution fiber system 110 is initially installed in the location 104, no branch optical fiber is installed between the premises of the potential end users 114 and the distribution fiber system. The potential end users are end users who do not subscribe to the optical communication service when the distribution fiber system is installed, but may opt to subscribe later. The tap-off modules 130 included in the distribution fiber system 110 enable potential end users who later opt to subscribe to the optical communication service to be easily and inexpensively connected to the distribution fiber system at any time. The tap-off modules enable the potential end users to be connected without interrupting the optical communication service to the actual end users 112.

Figure 2A:
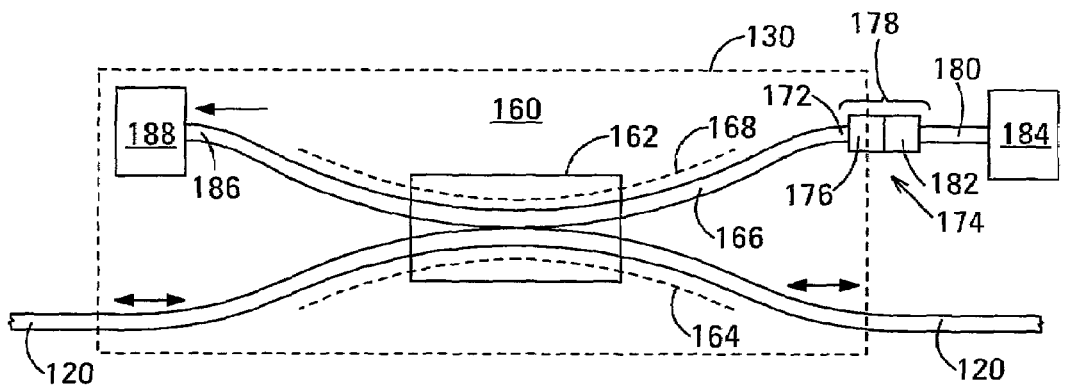
FIG. 2A shows a first embodiment of a tap-off module of the optical fiber-based communication system according to the invention before a branch optical fiber has been connected to it.
Figure 2B:
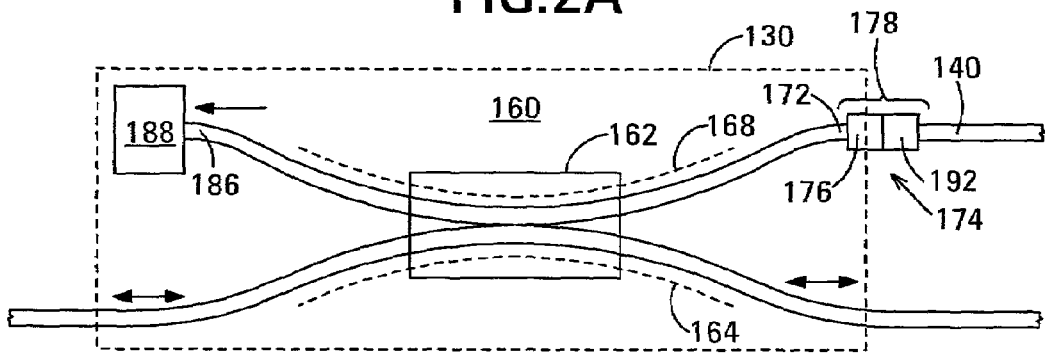
FIG. 2B shows the embodiment of the tap-off module shown in FIG. 2A after a branch optical fiber has been connected to it.

FIGS. 2A and 2B show the structure of a first embodiment 160 of an exemplary one of the tap-off modules 130. All the tap-off modules may be similarly structured. FIG. 2A shows the tap-off module before a branch optical fiber is connected to it. The tap-off modules are in the form shown in FIG. 2A after manufacture and before installation of the distribution fiber system 110 in a location. FIG. 2B shows the tap-off module after the branch optical fiber 140 has been connected to it.

Turning first to FIG. 2A, and referring throughout to FIG. 1, the tap-off module 160 includes the optical tap 162. The optical tap may be, for example, a 2% optical tap. The tap-off module is shown as including a single optical tap. However, at least some of the tap-off modules may include more than one optical tap and corresponding port if the topology of the end users requires this.

The distribution optical fiber 120 runs uninterrupted through the tap-off module 160, as it does through each of the other tap-off modules 130. In the tap-off module, the distribution optical fiber is bent to form the curved portion 164. The tap-off module additionally includes the coupling fiber 166. The coupling fiber is bent to form the curved portion 168. The curved portions 164 and 168 are convex in opposite directions and are arranged to contact one another substantially at the extremities of their convexities to form the optical tap 162. The coupling fiber receives light from, adds light to, or both receives light from and adds light to the distribution optical fiber by evanescent coupling at and near the region of contact between the fibers.

The end 172 of the coupling fiber 166 extends to the port 174. Light received from the communication head end 108 via the distribution optical fiber 120 is coupled to the end 172 of the coupling fiber. In the example shown in FIG. 2A, the coupling fiber terminates in the optical fiber connector half 176 at the port. The optical fiber connector half 176 is one half of the optical fiber connector 178. The optical fiber connector may be an FC/PC connector, for example. One end of a short length of optical fiber, the stub fiber 180, is fitted with the optical fiber connector half 182. The other end of the stub fiber is terminated with the anti-reflection termination 184.

During manufacture of the distribution fiber system 110, for each tap-off module, the optical fiber connector half 182 is mated with the optical fiber connector half 176 to connect the stub fiber 180 to the coupling fiber 166 at the port 174. The stub fiber terminated with the anti-reflection termination 184 prevents light received from the communications head end 108 and coupled via the optical tap 162 into the coupling fiber from being reflected by the end of the coupling fiber back through the optical tap towards the communication head-end. The stub fiber and its anti-reflection termination may optionally be omitted from the tap-off modules scheduled to have a branch optical fiber connected to them when the distribution fiber system is installed in the location 140. The stub fiber and its anti-reflection termination may also be omitted in systems in which reflections from the port 174 are tolerable.

The end 186 of the coupling fiber 166 remote from the port 174 is terminated with the anti-reflection termination 188. The anti-reflection termination 188 prevents light received from the portion of the distribution optical fiber 120 remote from communications head end 108 and coupled via the optical tap 162 into the coupling fiber from being reflected by the end 186 back through the optical tap into the distribution optical fiber. When the branch optical fiber 140 is connected to the port 174, as will be described below, the anti-reflection termination 188 prevents the end 186 of the coupling fiber from reflecting light transmitted by the end user and not coupled to the distribution optical fiber 120 back to the end user. The anti-reflection termination 188 may be omitted in systems in which reflections from the end 186 of the coupling fiber are tolerable.

The anti-reflection terminations 184 and 188 referred to above may be provided by, for example, immersing the end of the respective optical fiber in an index-matching fluid. Other forms of anti-reflection termination are known in the art and may be used.

An end user 106 located near the tap-off module 160 is connected to the distribution fiber system 110 by installing the branch optical fiber 140 that extends from the end user's premises to the tap-off module and changing the configuration of the tap-off module to that shown in FIG. 2B. This may be done for actual end users during installation of the distribution fiber system, and for potential end users when they opt to subscribe to the optical communication service. The branch optical fiber is fitted with the optical fiber connector half 192, which is similar to the optical fiber connector half 182. The stub fiber 180 connected to the tap-off module is replaced by the branch optical fiber 140 by disconnecting the optical fiber connector half 182 from the optical fiber connector half 176 and connecting the optical fiber connector half 192 to the optical fiber connector half 176. This simple process enables the end user to whose premises the branch optical fiber extends to be provided with the optical communication service, or to have the capacity of an existing optical communication service to be increased, without interrupting the service to the actual end users connected to the distribution fiber system 110.

Figure 3A:
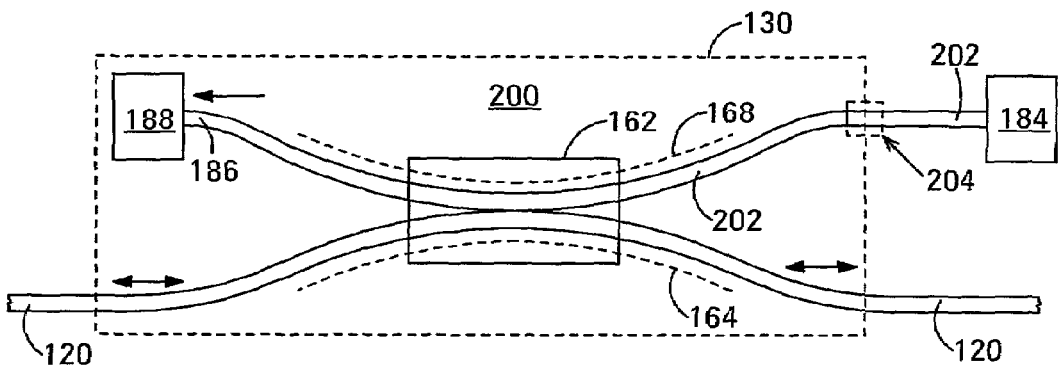
FIG. 3A shows a second embodiment of a tap-off module of the optical fiber-based communication system according to the invention before a branch optical fiber has been connected to it.
Figure 3B:
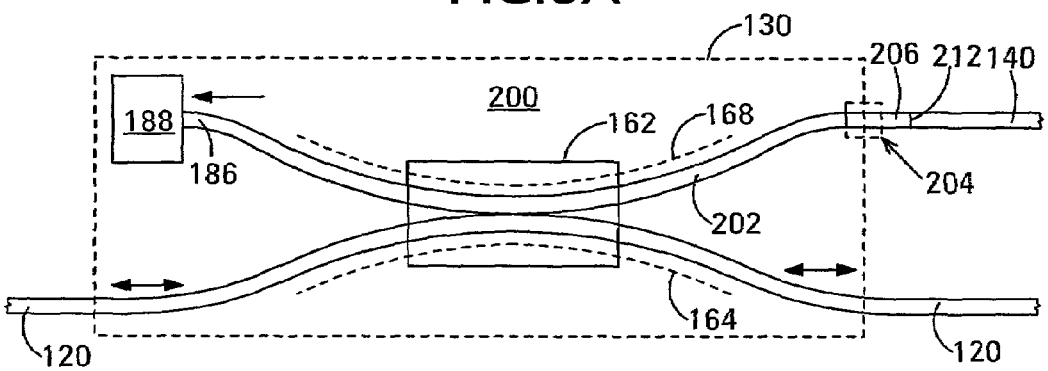
FIG. 3B shows the embodiment of the tap-off module shown in FIG. 3A after a branch optical fiber has been connected to it.

FIGS. 3A and 3B show the structure of a second embodiment 200 of an exemplary one of the tap-off modules 130. The tap-off module 200 lacks the optical fiber connector 178 of the tap-off module 160. When the branch optical fiber 140 is installed, it is connected to the port of the tap-off module by splicing it to the coupling fiber. All the tap-off modules may be similarly structured. Elements of the tap-off module 200 that correspond to the tap-off module 160 described above with reference to FIGS. 2A and 2B are indicated by the same reference numerals and will not be described again here.

FIG. 3A shows the tap-off module 200 before a branch optical fiber 140 is connected to the port 204. The tap-off modules are in the form shown in FIG. 3A after manufacture and before installation of the distribution fiber system 110 in a location. FIG. 3B shows the tap-off module after the branch optical fiber has been connected to it.

Turning first to FIG. 3A, and referring throughout to FIG. 1, during manufacture of the distribution fiber system 110 of which the tap-off module 200 forms part, the coupling fiber 202 is configured to extend through the port 204 and the end portion 206 of the coupling fiber at the port is connected to the anti-reflective termination 184. The function of the anti-reflection termination is described above. The anti-reflection termination may be omitted from tap-off modules scheduled to have a branch optical fiber connected to them when the distribution fiber system 110 is installed in the location 140. The anti-reflection termination may also be omitted in systems in which reflections from the port 204 are tolerable.

An end user 106 located near the tap-off module 200 is connected to the distribution fiber system 110 by installing the branch optical fiber 140 from the end user's premises to the tap-off module and by changing the configuration of the tap-off module to that shown in FIG. 3B. This may be done for actual end users during installation of the distribution fiber system, and for potential end users when they opt to subscribe the optical communication service.

The end user is connected to the distribution fiber system 110 by removing the anti-reflection termination 184 from the end portion 206 of the coupling fiber 202. For example, the anti-reflection termination may be removed by severing the end portion 206 of the coupling fiber 202 at a point between the port 204 and the anti-reflection termination 184 to remove the anti-reflection termination and part of the end portion 206 of the coupling fiber. The branch optical fiber is then spliced to the exposed end 212 of the remaining end portion 206 of the coupling fiber. A fusion splicer, known in the art, or another suitable type of optical fiber splicer, may be used to splice the branch optical fiber to the coupling fiber. Splicing the branch optical fiber to the coupling fiber enables the end user to whose premises the branch optical fiber runs to be provided with the optical communication service, or to have the capacity of an existing optical communication service to be increased, without interrupting the service to the other end users connected to the distribution fiber system 110.

Figure 4:
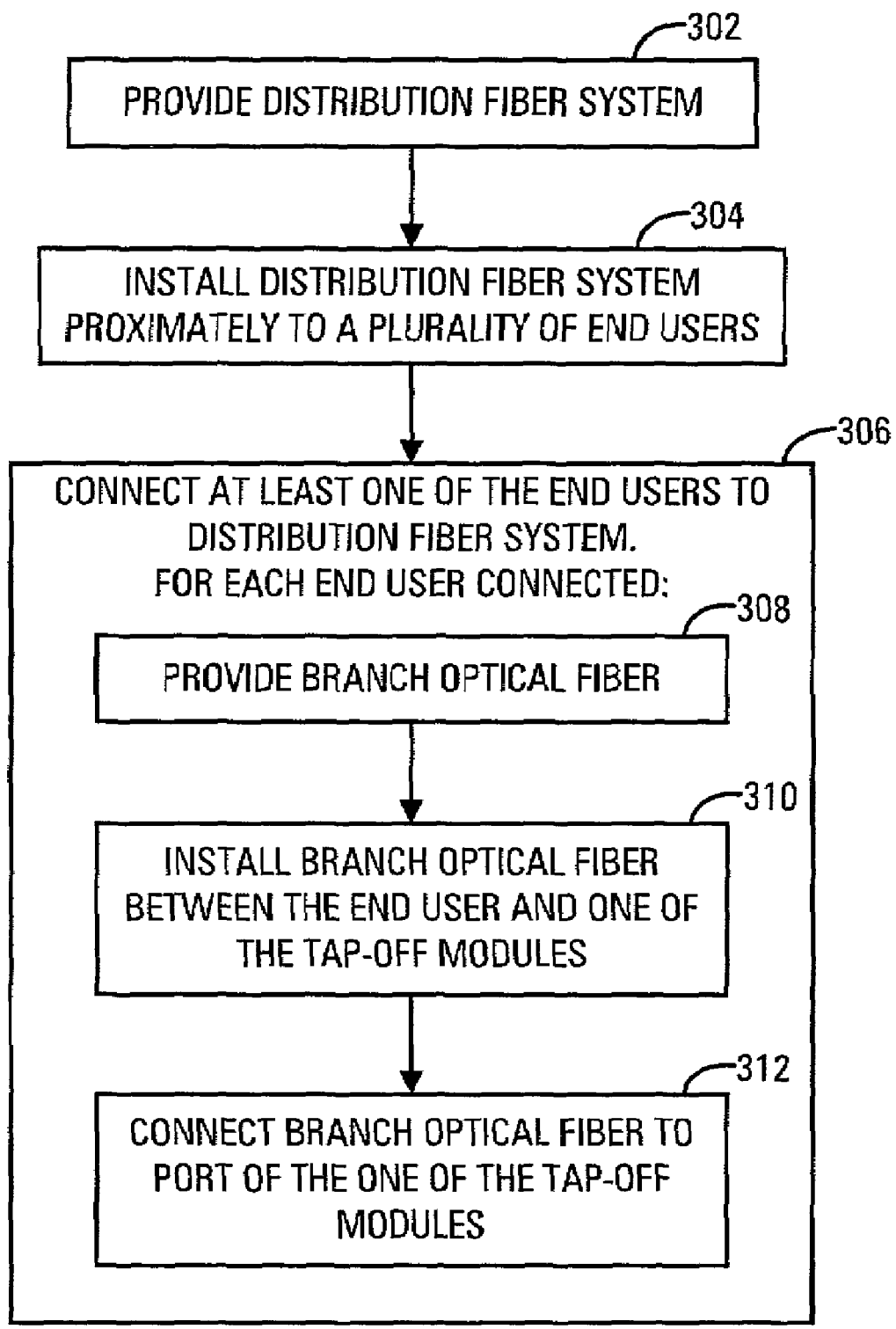
FIG. 4 is a flow chart illustrating the method according to the invention for establishing an optical fiber-based communication system.

A method 300 according to the invention for establishing an optical fiber-based communication system will now be described with reference to FIG. 4 and with additional reference to FIG. 1.

In process 302, a distribution fiber system is provided. The distribution fiber system includes a distribution optical fiber and tap-off modules coupled to the distribution optical fiber at intervals along its length. Each of the tap-off modules includes a port in optical communication with the distribution optical fiber.

In process 304, the distribution fiber system is installed proximately to a plurality of end users.

In process 306, at least one of the end users is connected to the distribution fiber system. Process 306 includes processes 308–310 that are performed for each end user connected to the distribution fiber system.

In process 308, a branch optical fiber is provided.

In process 310, the branch optical fiber is installed between the end user and one of the tap-off modules.

In process 312, the branch optical fiber is connected to the port of the one of the tap-off modules.

In process 302, the distribution fiber system may be supplied with at least some of the tap-off modules additionally including an anti-reflection termination connected to the port: for example, the anti-reflection termination 184 shown in FIGS. 2A and 3A. The anti-reflection termination is disconnected from the port prior to connecting the branch optical fiber to the port.

In process 302, the distribution fiber system may be supplied with the port of each of at least some of the tap-off modules additionally including a port optical fiber connector half. The branch optical fiber supplied in process 308 may include a branch optical fiber connector half. Process 312 may then be performed by mating the branch optical fiber connector half and the port optical fiber connector half. For example, the branch optical fiber connector half 192 shown in FIG. 2B may be mated with the port optical fiber connector half 176 also shown in FIG. 2B.

Additionally, in process 302, the distribution fiber system may be supplied with at least some of the tap-off modules including a stub fiber. The stub fiber includes a first end, a second end, a stub optical fiber connector half at the first end and an anti-reflection termination at the second end. The distribution fiber system is supplied with the stub optical fiber connector half mated to the port optical fiber connector half. For example, the stub optical fiber connector half 182 shown in FIG. 2A may be mated with the port optical fiber connector half 176 also shown in FIG. 2A. Then, in process 312, the stub fiber optical connector half is disconnected from the port fiber optical connector half to remove the stub fiber from the port prior to mating the branch optical fiber connector half and the port optical fiber connector half to connect the branch optical fiber to the port. For example, the stub fiber optical connector half 182 shown in FIG. 2A is disconnected from the port fiber optical connector half 176 shown in FIG. 2A prior to mating the branch optical fiber connector half 192 and the port optical fiber connector half 176, as shown in FIG. 2B.

In process 302, the distribution fiber system may be supplied with each of at least some of the tap-off modules additionally including a coupling fiber. The coupling fiber is in optical communication with the distribution optical fiber, and comprises an end portion that extends to the port, and additionally comprises an end remote from the end portion. For example, the coupling fiber 202 shown in FIG. 3B extends to the port 204 at its end portion 206. Then, in process 312, the branch optical fiber is spliced to the end portion of the coupling fiber to connect it to the port of the tap-off module. For example, FIG. 3B shows the branch optical fiber 140 spliced to the end portion 206 of the coupling fiber 202.

Additionally, in process 302, the distribution fiber system may be supplied with each of at least some of the tap-off modules additionally including an anti-reflection termination connected to the end portion of the coupling fiber, for example, the anti-reflection termination 184 shown in FIG. 3A. Then, in process 312, the anti-reflection termination is removed from the end portion of the coupling fiber prior to splicing the branch optical fiber to the coupling fiber. For example, the anti-reflection termination 184 is removed from the coupling fiber 202 by severing part of the end portion 206 from the remainder of the coupling fiber, as shown in FIG. 3A, prior to splicing the branch optical fiber 140 to the coupling fiber, as shown in FIG. 3B.

The optical communication service referred to above encompasses any one-way or two-way information or entertainment service that can be provided by means of an optical information signal transmitted through an optical fiber. Such services include, but are not limited to, telephone service, Internet or other network service, cable television service, alarm service and video-on-demand service.

Although this disclosure describes illustrative embodiments of the invention in detail, it is to be understood that the invention is not limited to the precise embodiments described, and that various modifications may be practiced within the scope of the invention defined by the appended claims.

We claim:

1. An optical fiber-based communication system, comprising:
    a distribution optical fiber extending proximately to a plurality of end users, the distribution optical fiber having a length;
    located at intervals along at least part of the length of the distribution optical fiber, tap-off modules through which the distribution optical fiber passes uninterrupted, each of the tap-off modules including:
        a port comprising a first optical fiber connector half;
        a coupling fiber including an end portion that extends to the port, wherein the end portion of the coupling fiber is optically connected to the first optical fiber connector half, the coupling fiber additionally includes an end remote from the end portion, each of at least some of the tap-off modules additionally includes an anti-reflection termination at the end of the coupling fiber, and
        a single evanescent coupling between the coupling fiber and the distribution optical fiber; and
    a branch optical fiber connected to the port of each of at least some of the tap-off modules and extending to a corresponding one of the end users, the branch optical fiber comprising a second optical fiber connector half, the second optical fiber connector half being mated with the first optical fiber connector half to connect the branch optical fiber to the port.

2. The optical fiber-based communication system of claim 1, in which each of at least some of the tap-off modules to which no branch optical fiber is connected includes a stub fiber comprising a first end, a second end, a second optical fiber connector half at the first end, and an anti-reflection termination at the second end, the second optical fiber connector half being mated with the first optical fiber connector half to connect the stub fiber to the port.

3. The optical fiber-based communication system of claim 1, in which:
    the tap-off module additionally includes an anti-reflection termination at at least one of (a) the end portion of the coupling fiber, and (b) the end of the coupling fiber.

4. The optical fiber-based communication system of claim 1, in which:
    each of at least some of the tap-off modules to which no branch optical fiber is connected includes an anti-reflection termination at at least one of (a) the end portion of the coupling fiber, and (b) the end of the coupling fiber.

5. The optical fiber-based communication system of claim 1, additionally comprising at least one regeneration amplifier optically coupled to the distribution optical fiber.

6. The method for establishing an optical fiber-based communication system, the method comprising:
    providing a distribution fiber system including a distribution optical fiber having a length and, located at intervals along at least part of the length of the distribution optical fiber, tap-off modules through which the distribution optical fiber passes uninterrupted, each of the tap-off modules including a port and a single evanescent coupling between the port and the distribution optical fiber, the port of each of at least some of the tap-off modules additionally including a port optical fiber connector half, each of at least some of the tap-off modules additionally including a stub fiber having a first end, a second end, a stub optical fiber connector half at the first end and an anti-reflection termination at the second end, the stub optical fiber connector half being mated to the port optical fiber connector half;

installing the distribution fiber system proximately to a plurality of end users; and connecting at least one of the end users to the distribution fiber system, including, for each end user connected to the distribution fiber system:

providing a branch optical fiber, the branch optical fiber including a branch optical fiber connector half, installing the branch optical fiber between the end user and one of the tap-off modules, and connecting the branch optical fiber to the port of the one of the tap-off modules by disconnecting the stub fiber optical connector half from the port fiber optical connector half to remove the stub optical fiber from the port prior to mating the branch optical fiber connector half and port optical fiber connector half.

7. The method of claim 6, in which:

in providing the distribution fiber system, each of at least some of the tap-off modules additionally includes an anti-reflection termination optically connected to the port; and the method additionally comprises disconnecting the anti-reflection termination from the port prior to connecting the branch optical fiber to the port.

8. The method of claim 6, in which:

in providing the distribution fiber system, the single evanescent coupling between the port and the distribution fiber includes a coupling fiber and a single evanescent coupling between the coupling fiber and the distribution optical fiber, the coupling fiber comprising and end portion that extends to the port and additionally comprising and end remote from the end portion; and connecting the branch optical fiber to the port of the one of the tap-off modules includes splicing the branch optical fiber to the end portion of the coupling fiber.

9. The method of claim 8, in which:

in providing the distribution fiber system, each of at least some of the tap-off modules additionally includes an anti-reflection termination connected to the end portion of the coupling fiber; and connecting the branch optical fiber to the port of the one of the tap-off modules includes removing the anti-reflection termination from the end portion of the coupling fiber prior to splicing the branch optical fiber to the end portion.

10. The method of claim 6, additionally comprising regenerating an optical signal at intervals along the distribution optical fiber.

11. A distribution fiber system for an optical fiber-based optical communication system, the distribution fiber system comprising:

a distribution optical fiber having a length; and at intervals along at least part of the length of the distribution optical fiber, tap-off modules through which the distribution optical fiber passes uninterrupted, each of the tap-off modules including:

a port, a coupling fiber extending to the port comprising an end portion that extends to the port and an end remote from the end portion, and a single evanescent coupling system between the coupling fiber and the distribution optical fiber, wherein each of at least some of the tap-off modules additionally includes an anti-reflection termination at at least one of (a) the end portion of the coupling fiber, and (b) the end of the coupling fiber.

12. The distribution fiber system of claim 11, in which each of at least some of the tap-off modules includes a stub fiber connected to the port, the stub fiber including an anti-reflection termination at an end thereof remote from the port.

13. The distribution fiber system of claim 11, additionally comprising at least one regeneration amplifier optically coupled to the distribution optical fiber.

14. An optical fiber-based communication system, comprising:

a distribution optical fiber extending proximately to a plurality of end users, the distribution optical fiber having a length;

located at intervals along at least part of the length of the distribution optical fiber, tap-off modules through which the distribution optical fiber passes uninterrupted, each of the tap-off modules including:

a port comprising a first optical fiber;

a coupling fiber including an end portion that extends to the port, wherein the end portion of the coupling fiber is optically connected to the first optical fiber, the coupling fiber additionally includes an end remote from the end portion, and each of at least some of the tap-off modules additionally includes an anti-reflection termination at the end of the coupling fiber, and a single evanescent coupling between the coupling fiber and the distribution optical fiber; and a branch optical fiber connected to the port of each of at least some of the tap-off modules and extending to a corresponding one of the end users, the branch optical fiber comprising a second optical fiber, the second optical fiber mated with the first optical fiber to connect the branch optical fiber to the port.

15. The optical fiber-based communication system of claim 14, in which:

the branch optical fiber is spliced to the end portion of the coupling fiber.

16. The optical fiber-based communication system of claim 14, in which:

the coupling fiber additionally includes an end remote from the end portion; and each of at least some of the tap-off modules additionally includes an anti-reflection termination at the end of the coupling fiber.

* * * * *